United States Patent [19]

Hoinski

[11] 4,187,834
[45] Feb. 12, 1980

[54] SOLAR HEATING SYSTEM

[75] Inventor: Walter W. Hoinski, Norristown, Pa.

[73] Assignee: Power Systems Development Corporation, Wilmington, Del.

[21] Appl. No.: 860,707

[22] Filed: Dec. 15, 1977

[51] Int. Cl.² .............................................. F24J 3/02
[52] U.S. Cl. .............................. 126/425; 250/203 R; 126/440
[58] Field of Search ............................. 126/270, 271; 250/203 R; 353/3; 350/288, 299; 237/1 A; 60/641

[56] References Cited

U.S. PATENT DOCUMENTS

| | | | |
|---|---|---|---|
| 4,004,574 | 1/1977 | Barr | 126/271 |
| 4,061,130 | 12/1977 | Gonzalez | 126/271 |
| 4,068,653 | 1/1978 | Bourdon et al. | 126/271 |
| 4,090,498 | 5/1978 | Benson | 126/271 |

Primary Examiner—James C. Yeung
Attorney, Agent, or Firm—Paul & Paul

[57] ABSTRACT

A solar heating system for heating a fluid with the infrared rays of the sun to provide a thermal supply to a building usable for heating the building and the domestic hot water supply thereto may have a solar heat absorbing panel for heating the fluid, which panel may be positioned away from the building, and a heated fluid storage tank with a conduit connection therebetween, wherein a mechanism may be connected to the solar heat absorbing panel for rotating this panel in two orthogonal planes of motion for aligning the panel with the direct rays of the sun including an electrical control circuit which may provide signals for positioning the panel preparatory to the beginning of each day and for changing the position of the panel when misalignment with the direct rays of sun occurs as well as for returning the panel to its initial beginning of day position when the temperature of the fluid within the storage tank reaches an upper limit.

14 Claims, 10 Drawing Figures

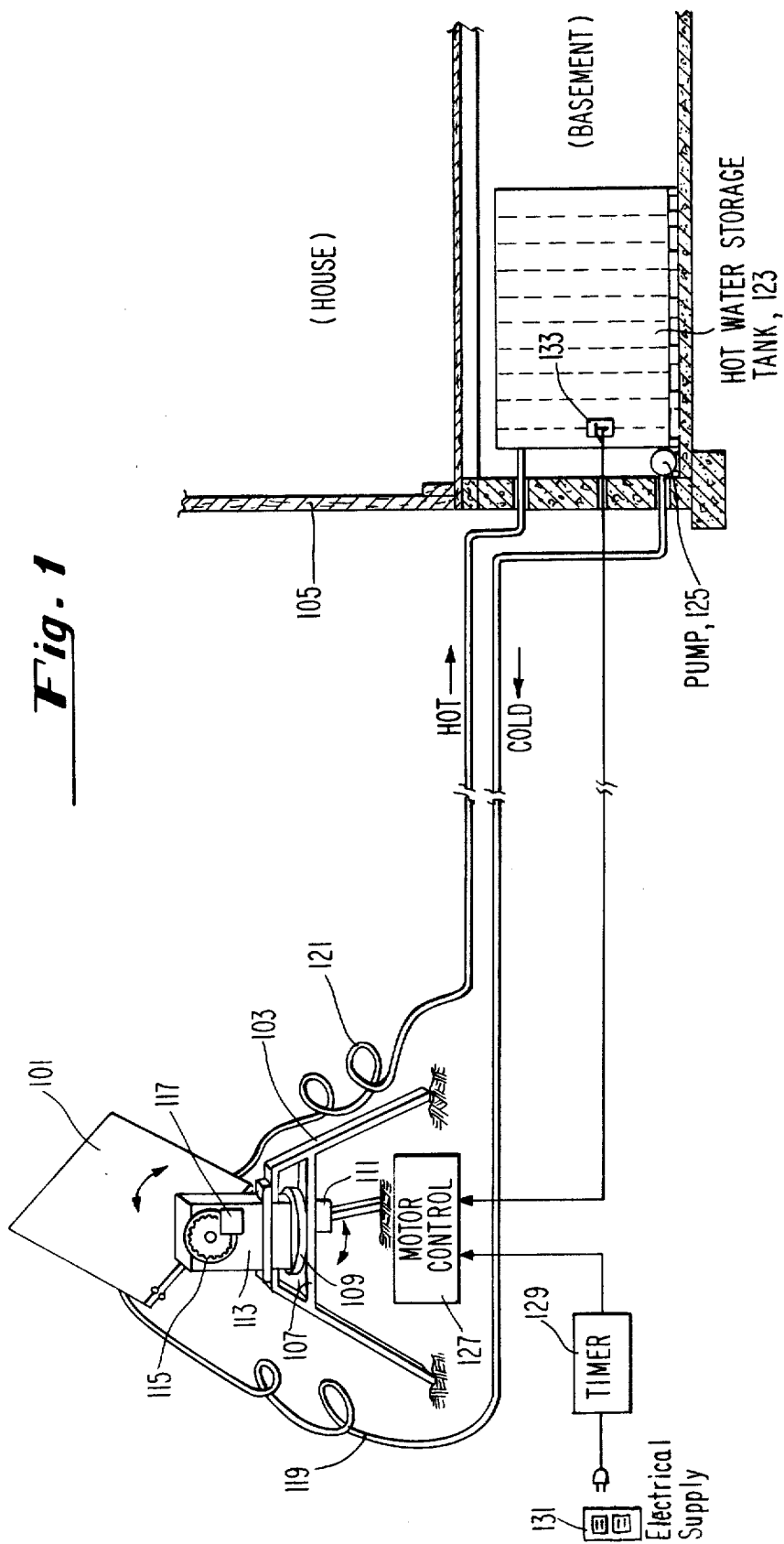

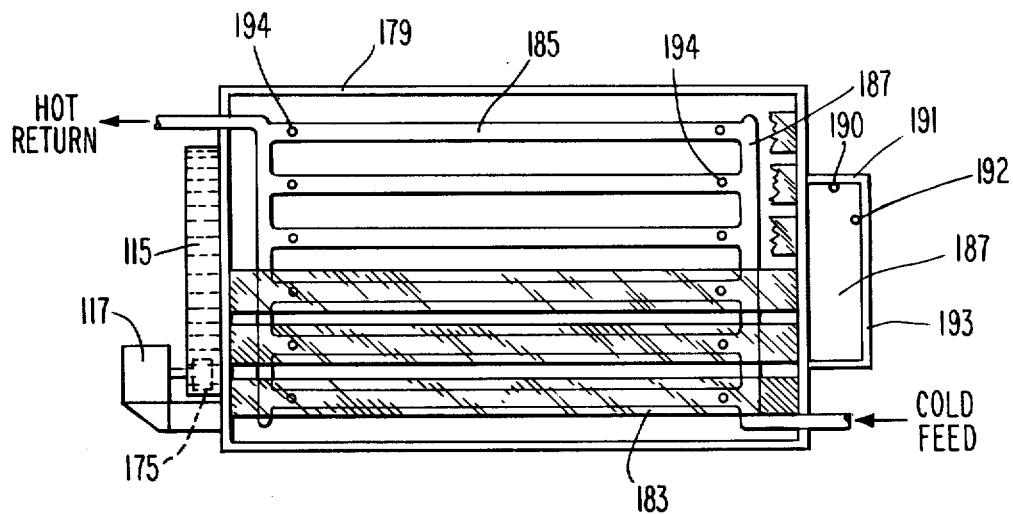
*Fig. 5*
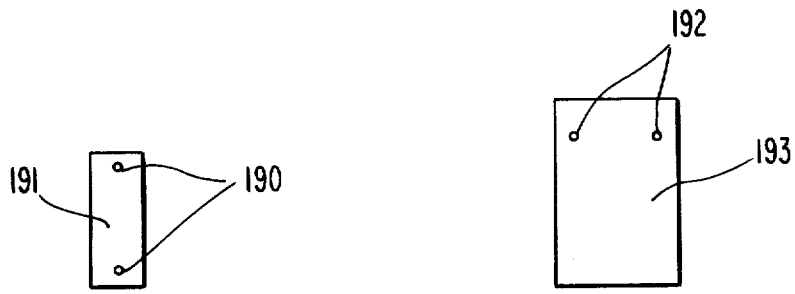
*Fig. 5a*   *Fig. 5b*

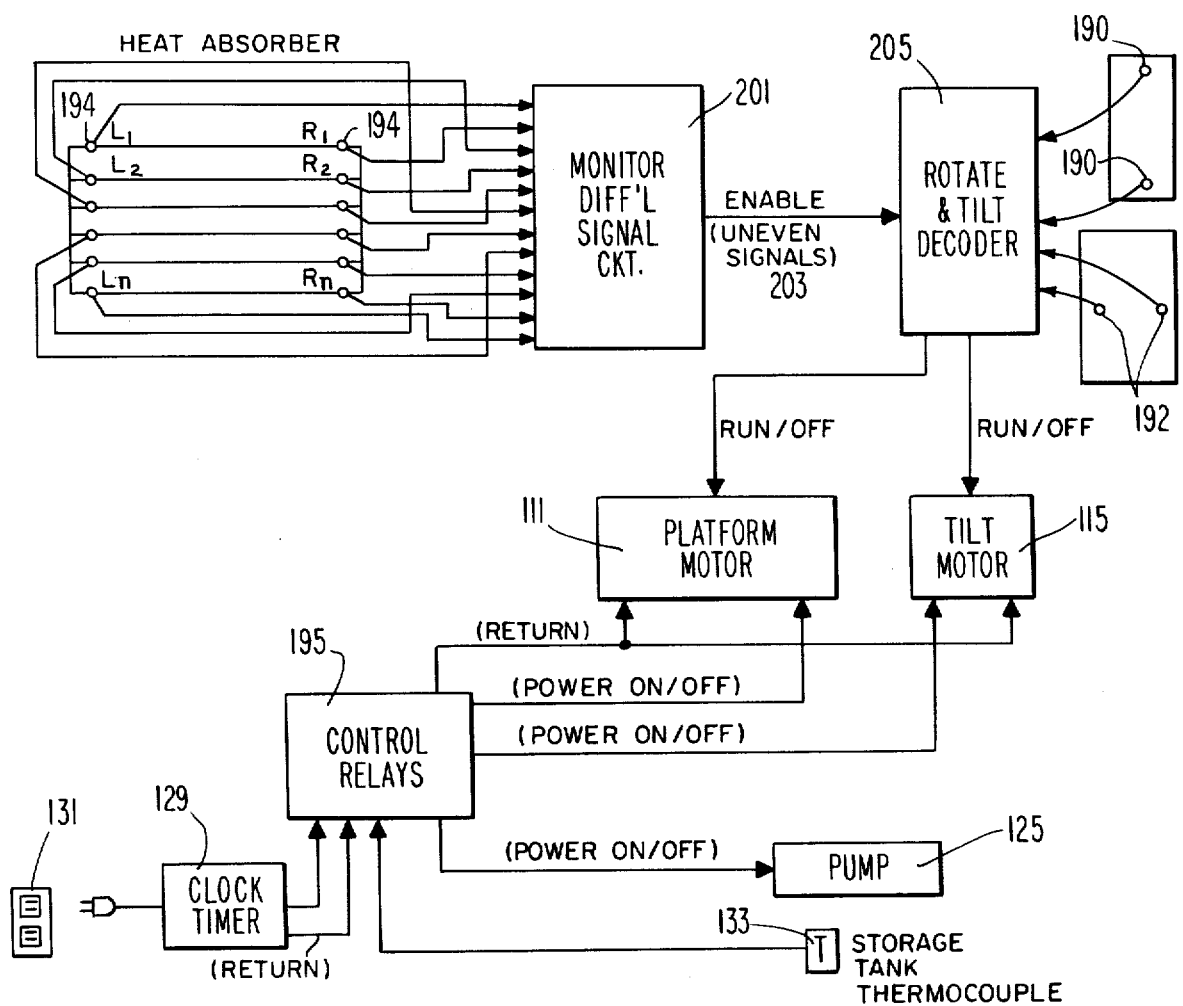
_Fig. 6_
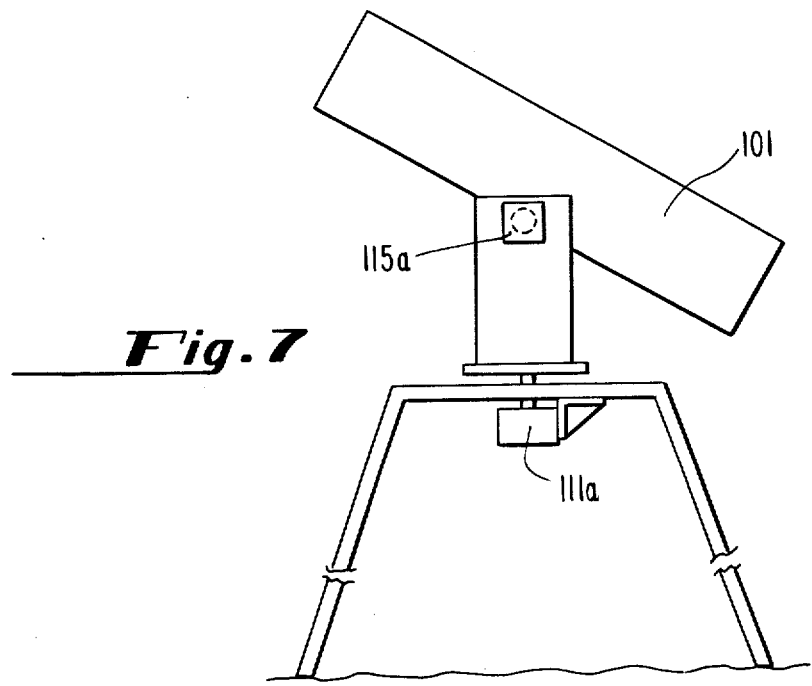
_Fig. 7_

SOLAR HEATING SYSTEM

BACKGROUND OF THE INVENTION

This invention generally relates to solar heaters and specifically relates to solar heating systems designed for heating a heat transfer fluid such as air or water for providing a supply of this heated fluid to a residential or commercial building.

Mankind has always benefited from the infrared rays of the sun to warm his surroundings and his personal being. Technologists have been at work throughout the centuries trying to develop apparatus for converting to useful purposes the sun's heat reaching the earth's surface.

During the early part of this century solar heating systems began to be developed for heating residential or commercial buildings. These solar heating systems invariably utilized collectors which acted as thermal heat exchangers by which the heat from the sun's rays could be absorbed into a heat transfer and conducting medium or fluid, i.e., air or water.

The recent oil embargoes and fuel shortages have promoted renewed interest in solar heaters. Developments have been directed toward focusing devices for concentrating the sun's rays upon an absorbing apparatus. These focusing devices have taken one of two general formats. The first is a parabollic reflector placed behind the absorbing apparatus which concentrates the reflected rays of the sun upon a focal point at which is located a heat absorbing or heat transfer apparatus. The second is a focusing lens placed intermediate the sun and the absorbing apparatus and is shaped to concentrate the sun's rays upon a focal point located on the absorbing apparatus.

Other developments have included rotating devices for rotating the focusing device from east to west throughout the day in order to catch the direct rays of the sun. Such rotating devices have normally been driven by a clock timer to catch the sun in the east at the beginning of the day and in the west at the end of the day.

Traditionally, non-rotating solar heat absorbing units have been canted at an angle of approximately 45° with the horizon and have been positioned generally facing south. This orientation has permitted a maximum absorption of direct (perpendicular) rays from the sun throughout the solar heating day. The term "solar heating day" as used herein means those daylight hours during any day which the sun is in the sky and during which a solar heating system can be operated (i.e., the time between sunrise and sunset).

Many problems exist with these prior solar heating arrangements. These problems are centered around the relative inefficiency of these units. This inefficiency contributes to the relatively small heating capacity of such units which in turn contributes to the necessity for very large solar heat collectors or solar heat absorption panels. These very large panels become bery unsightly and cumbersome and heavy. Heavy absorption panels require a large structure such as the roof or walls of a building to support them. These panels have been placed on a southerly facing roof section of the building or when the building has a flat roof, have been placed on the top of such a flat roof surface. The efficiency of such a heating system is directly proportional to the heat absorption efficiency of the thermal heat absorbing panel which in turn is directly related to the angle at which it is oriented with respect to the direct rays of the sun.

An object of this invention is to provide a high efficiency solar heating system which requires a relatively small thermal heat absorbing unit.

A second object of this invention is to provide such a heating system which is capable of orienting the thermal heat absorption unit in two directions from east to west and from horizontal to vertical for aligning the thermal absorption unit orthogonally with the direction of the sun throughout the solar day and throughout the year.

Another object of this invention is to provide such a solar heating system wherein the heat absorption unit may be free standing and located away from the roof or other structural portion of a building being heated.

A further object of this invention is to provide a large thermal storage tank which may be heated to a desired temperature by the optimal operation of the solar heating system completely independently of the heating system (the heat transfer system) within the building.

An even further object of this invention is to provide an electrical control circuit or controlling the orientation of the thermal heat absorbing unit.

SUMMARY OF THE INVENTION

The objects of this invention are realized in a solar heating system which may have a high efficiency solar heat absorbing panel or unit positionable, continually, in an orthogonal orientation with the direction of the sun's direct rays. This heat absorbing panel may be mounted upon an independent support structure which may be located in proximity to, but a distance from, the building being heated by the system. Included with the support structure may be an electrical motor-driven mechanism for rotating the solar heat absorbing panel in a horizontal plane from east to west as well as rotating or tilting the solar heat absorbing panel in a vertical plane from vertical to horizontal.

Located in proximity to the conventional heating system of the building may be solar heat storage tank. Water may be circulated through the solar heat absorbing panel and between the solar heat absorbing panel and the solar heat storage tank for raising the temperature of water stored in the tank to a desired level. Insulated and flexible conduit may be utilized to conduct the heat transfer fluid (water) between the solar heat absorbing panel and the storage tank. A pump may be activated for moving the water at a desired rate.

An electrical control system may be connected to the electrical motors for controlling the orientation of the solar heat absorbing panel in both the horizontal and vertical directions. This electrical control circuit may include a clock timer for orienting the absorbing unit with respect to the beginning of the solar heating day. A temperature sensing device located within the storage tank may control the shutting down of the operation of the solar heat absorbing unit when the temperature within the storage tank has reached a threshold value. Heat sensitive monitors may be positioned strategically about the sun facing side of the heat absorbing unit while sun dial heat sensors responsive to the output of the heat absorbing unit heat monitors are positioned in fixed physical relationship to the solar heat absorbing unit to control the operation of the positioning motors for orienting the heat absorbing unit orthogonally with the direct rays of the sun as the sun moves across the sky during a solar heating day.

DESCRIPTION OF THE DRAWINGS

The advantages, features and operation of the invention can easily be understood from a reading of the following detailed description of the invention in conjunction with the attached drawings and wherein like numerals refer to like elements and in which:

FIG. 1 shows the general interconnection of the assembled entire solar heating system;

FIG. 5 shows a plan view (looking into from the direction of the sun) of the solar heating panel;

FIG. 5a shows an inside panel sun dial heat sensor pair;

FIG. 5b shows a second inside panel sun dial heat sensor pair;

FIG. 6 is a circuit diagram for the thermo-electrical control circuit for the system; and FIG. 7 shows a side view of the solar heat absorbing panel and its support and orientation control structure in an alternate embodiment thereof.

DETAILED DESCRIPTION

Figure 2A:
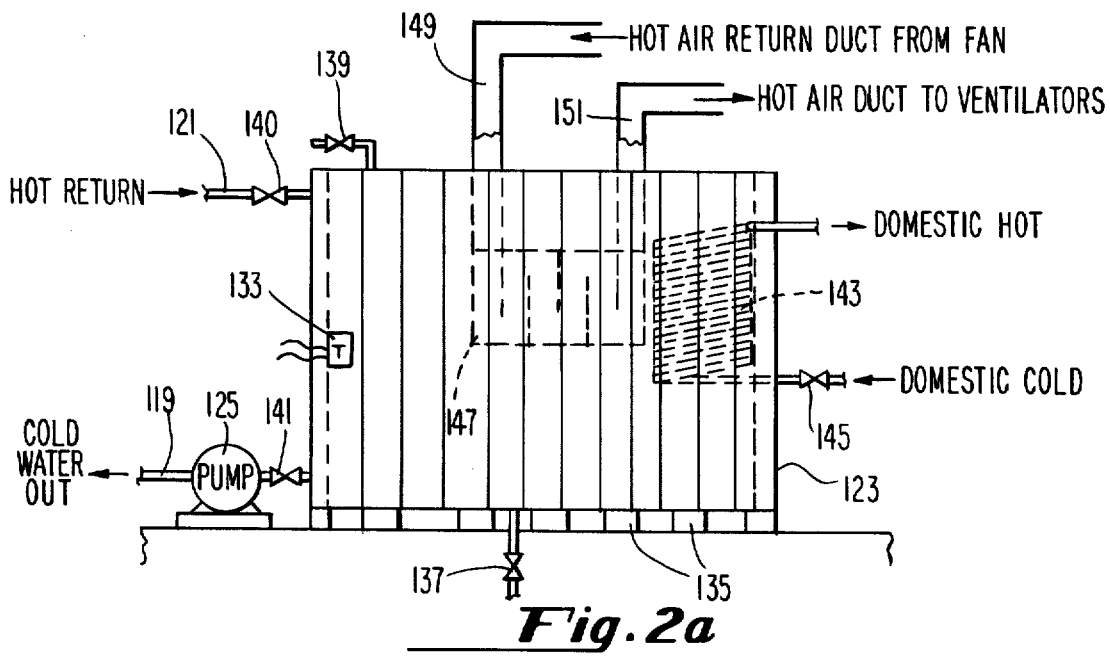
FIG. 2a presents the storage tank when used in conjunction with a hot air conventional heating structure.

A solar heating system for use in conjunction with conventional heat distribution units within a residential or commercial building can provide the primary or an auxiliary source of heat for the building. A solar heat absorbing panel 101 is situated upon a support member 103 which may be anchored into the ground a distance from a building 105, such as a house, being heated by the solar heating system. Alternately, the support 103 may be mounted on the building 105.

Solar heat absorbing panel 101 is essentially rectangularly shaped. The support 103 can be tripod shaped truss or other type of support member for providing an operating platform 107 portion thereof a distance above ground level. Situated upon the operating platform 107 is a rotating gear member 109 whose position is controlled by the operation of an electrical motor 111. Connected directly to the gear 109 are vertical support members 113. These vertical support members support the solar heat absorbing panel 101. Connected to the vertical support members 113 is a vertically oriented second gear 115 which in turn is connected to the solar heat absorbing unit 103. A second motor 117 is positioned to rotate this second gear 115 to tilt the solar heat absorbing panel 101.

Solar heat absorbing panel 101 is capable of holding a quantity of water. Connected to this heat absorbing panel 101 is a flexible water feed conduit 119 and a flexible water return conduit 121.

A water storage tank 123 located in the basement of the building 105. An electrically driven pump 125 located adjacent to the water storage tank 123 is connected to pump cold water from the bottom of the water storage tank 123 to the solar heat absorbing panel 101 via the conduit 119. The hot return conduit 121 is connected from the solar heat absorbing panel 101 to the top of water storage tank 123.

An electric motor control circuit 127 provides the control for operating the positioning motors 111 and 117. This electric control circuit 127 is connected to a timer 129 connected into a 110 volt 60 cycle electrical supply 131. The motor control circuit 127 is also interconnected with an electric thermocouple temperature sensing device 133 positioned within the hot water storage tank 123.

Hot water storage tank 123, FIG. 2a, is most conveniently located in the basement of the building 105 being heated. However, this storage tank 123 may also be buried in the ground adjacent to the building 105 or adjacent to the support structure 103 for the solar heat absorbing unit 101. In the situation where the tank 123 is buried in the ground, this tank is constructed of a double-jacketed insulated steel material. In the instance where it is located in the basement of the building 105 being heated, it is constructed of two inch cedar or redwood planks. Hot water supply tank 123 can be barrel-shaped or essentially round and can be made to any size corresponding to the heat capacity needed for the building 105. Typically, such a tank can hold 2,000 gallons of water and be approximately 6 feet in diameter and 10 feet long. The 2 inch cedar or redwood planks for this tank 123 have been accurately milled and strapped together with bands to form a water tight seal. The tank 123 is blocked and positioned upon 4 inch by 4 inch blocks or planks 135 which rest on the basement floor. Styrofoam insulation or its equivalent completely surround the outside of the tank 123.

A drain valve 137 is located at the bottom of the tank to permit the complete drainage of the tank 123. A purge valve 139 is connected to vent the top of the tank 123 and permits bleeding of any air trapped in the system.

As to the hot water return from the solar unit is connected to the top of the tank 123 via the hot return conduit 121, this conduit 121 is connected via a tapered pipe connection through the top side wall of the tank 123. A valve 140 is located in the conduit 121 to close off the return to the tank 123.

Cold water return conduit 119 fed by the circulating pump 125 is connected directly to the exhaust thereof. The intake of the circulating pump 125 is connected to the bottom of the end of the storage tank 123 where a safety valve 141 is positioned in the piping between the pump 125 and the tank 123. Pump 125 may be mounted on a stand positioned on the floor of the basement.

Heat sensing electrical thermocouple 133 is positioned within the tank 123 at about its mid-height. The temperature registered by the thermocouple 133 gives an average temperature of the water in tank between the coldest water layer at the bottom and the hottest water layer at the top. The electrical sensor 133 is located within a water tight container attached to the wall of the tank 123. Electrical connections to the sensor 133 pass through the wall of the tank 123 via water tight feed-through holes.

Positioned also within the hot water storage tank 123 is a domestic hot water heating coil 143. This domestic heating coil 143 is cylindrically shaped by a helical winding of the coil and is oriented within the hot water storage tank 123 with its longitudinal axis extending vertically. The bottom end of this domestic hot water heating coil 143 exits the side of the storage tank 123 through a water tight feed-through and is connected to the domestic cold water supply. A mechanically operated valve 145 is positioned in the cold water supply line to the coil 143. The top end of the coil exits the side of the tank 123 and is connected to the domestic hot water supply lines for the building 105.

Positioned within the storage tank 123 at approximately the middle of the tank is a water tight air heat exchanger 147. This heat exchanger 147 is connected to the hot air heating system of the building 105 through a cold air return duct 149 entering the top of the storage tank 123 from the circulating fan of the hot air heating system and through a hot air heating duct 151 which exits the top of the tank 123 to the ventilators of the hot air heating system of the building 105. Air heat exchanger 147 can be rectangularly shaped and can contain baffles to define a torturous path for the air passing therethrough. Such a path provides a maximum of surface area for heat exchange between the hot water held by the tank 123 and the air passing through the heat exchanger 147.

Figure 2B:
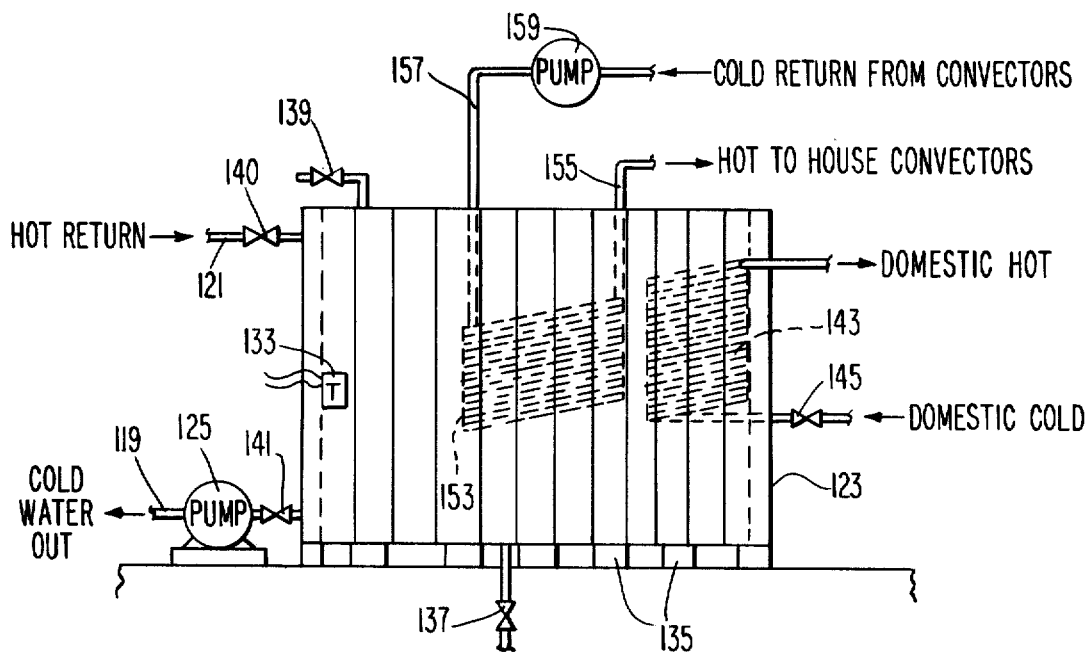
FIG. 2b shows the structure configuration of this storage tank when used in conjunction with a conventional hot water convector system.

An alternate embodiment for the hot water storage tank 123 is shown in FIG. 2b wherein the solar heating system is used in conjunction with a conventional hot water heating system for the building 105. In this instance, the water tight air heat exchanger 147 and cold and hot air ducting 149 and 151 are replaced by a hot water heating coil 153 positioned in the center of the hot water storage tank 123. This heating coil is of a sufficient size and capacity to service the heating needs of the building 105 when the temperature of the hot water stored in the tank 123 is maintained. The hot water heating coil 153 is connected to a hot return pipe 155 to the building 105 convectors and a cold return 157 from the convectors. The building water heating system is normally a closed system so that there is maintained a tight seal between the water circulating through the heating coil 153 and the water stored in the storage tank 123. A circulating pump 159 which operates off of the building temperature thermostat circulates the water through the heating coil 153.

Figure 3:
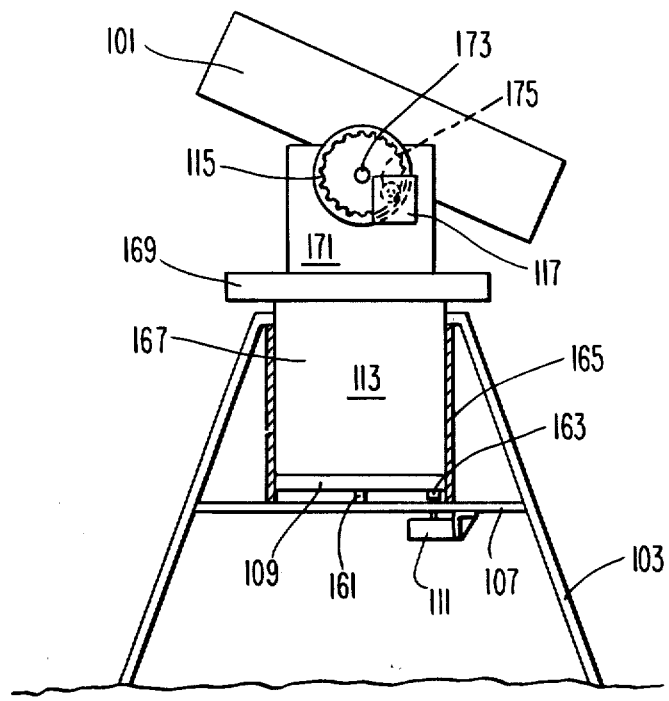
FIG. 3 shows a side view of the solar heat absorbing unit and its orientation and support structure including the electrical motors for determining the position of the solar heat absorbing panel.

The support 103 includes a plurality of legs forming a three legged "A" frame, FIG. 3. Secured to an intermediate point along the legs is a support platform 107. This platform 107 holds the structure for revolving the heat absorbing unit 101. The first large gear 109 is mounted horizontally on a short shaft 161. This shaft has a bearing surface at one end thereof which is fitted into a receiving hole in the support platform 107 containing a second bearing surface. Numerous types of bearing surfaces for the shaft 161 may be employed. Typically, Babbit bearings or tapered roller bearings may be used. Additionally, the bearing end of the shaft 161 may be machined and fitted with a thrust bearing.

The gear 109 is a sun gear which has been machined to provide gear teeth which project radially inwardly from a projection of the circumferential wall of the gear which wall presents a smooth cylindrical surface.

The gear 109 is mounted above the support platform with the shaft 161 inserted into the platform 107. The teeth of the gear 109 face the surface of the platform 107.

Electric motor 111 is mounted on the underside of the platform 107. The shaft of the motor 111 extends upwardly through the platform 107. Attached to the end of the motor 111 shaft is a pinion gear 163 positioned to contact the teeth of the first large gear 109. Rotation of the motor 111 causes a rotation of the gear 109.

Gear 109 is also positioned within a cylindrical member 165 which has been constructed as part of the support members 103 and the support platform 107. This cylindrical support member 165 extends upwardly from the support platform 107 and orthogonally thereto, a considerable distance. The inside dimensions of this support cylinder 165 are slightly larger than the diameter of the gear 109 so that the gear 109 rides against and is supported by the inside wall of the support cylinder 165. The vertical support 113 can have a rectangular cross section or can have a cylindrical cross section. In this latter instance, a lower cylindrical vertical support 167 has been welded or otherwise attached to the upwardly facing side of the gear 109. Cylindrical vertical support member 167 has an outside dimension slightly smaller than the vertical support cylinder 165 and bears against this support cylinder 165 when the gear 109 rotates. The bearing surfaces between the cylindrically shaped vertical support 167 and the support cylinder 165 may be machined smooth. A grease or other lubricant may be applied therebetween to reduce friction.

Cylindrical vertical support 167 extends a short distance beyond the vertical support cylinder 165. Attached to the open end of the cylindrical vertical support 167 is a rectangular plate 169. Attached to the upwardly facing surface of this plate 169 are a pair of vertical support plates 171 positioned parallel to one another and spaced a sufficient distance apart to receive the solar heat absorbing panel 101 and its associated mechanisms.

A bearing hole through which an axle 173 is fitted exists in each vertical support plate 171 so that the axle 173 is supported in a horizontal plane. The solar heat absorbing panel 101 is rigidly fixed to this axle 173 at a position between the two support plates 171. As the axle 173 is rotated, the solar heating panel 101 is tilted between the vertical and horizontal position.

Secured to one end of the shaft 173 is the second large sun gear 115. Second large gear 115 is of an identical design to the gear 109 and is positioned on the shaft so that the side having the gear teeth faces away from the vertical support plate 171. Attached to the vertical support plate 171 and spaced away therefrom, in a position so as to engage the gear 115, is a second electric motor 117. The electric motor 117 is similar to electric motor 111 as it has a pinion gear 175 attached to the motor shaft extending therefrom. This second pinion gear 175 engages the gear teeth of the second larger gear 115. Rotation of the motor 117 creates rotation or tilting of the solar heat absorbing unit 101, FIG. 4.

Figure 4:
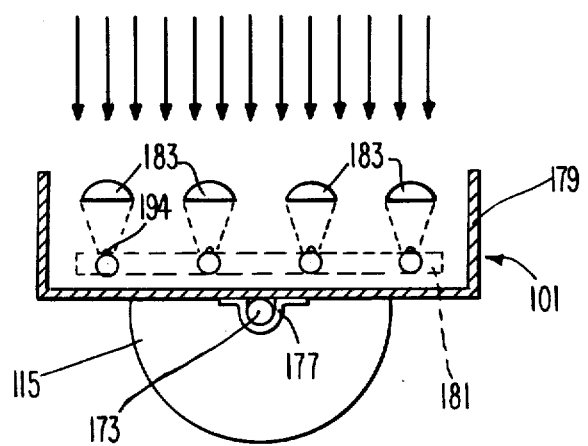
FIG. 4 shows a cross section of the solar heat absorbing panel.

The shaft 173 is affixedly attached to the solar heating panel 101 via a weld and strap member 177, FIG. 4. The heat absorbing panel 101 has a rectangular configuration and is attached to the shaft 173 along the centerline for its longer dimension so as to be rectilinearly positioned between the vertical support plates 171 with its outer walls parallel thereto. Solar heat absorbing panel 101 includes a rectangular enclosure 179, FIGS. 4, 5, which forms the outer dimension thereof. This rectangular enclosure 179 has five side walls with one of the two large side walls being absent to provide a large open face. Nominally, the rectangular support will be 6 to 10 feet long by 4 to 6 wide by 1 foot deep. Attached to the closed bottom of the rectangular support 179 is a tubular heat absorbing component 181. Positioned above the tubular heat absorbing component 181 is a plurality of fixed lens 183 each positioned to concentrate a certain number of the sun's rays entering the opened side of the rectangular enclosure 179 upon a particular area of the tubular heat absorbing component 181. Positioned on the sun facing side of heat absorbing component 181 are a plurality of heat monitors 194.

Tubular heat absorbing component 181, FIG. 5, includes a plurality of parallel extending tubular members or pipes 185 each being attached to an input manifold 187 on one end and an output manifold 189 on the other end. Cold water feed conduit 119 is connected to input manifold 187 while hot return conduit 121 is connected to output manifold 189.

The manifolds 187 and 189 as well as the parallel pipes 185 connected therebetween are attached to the bottom of the rectangular enclosure 179. The cold and hot conduits 119 and 121 pass through the side walls of the rectangular enclosure 179. The plurality of lenses 183 are positioned between the side walls of the enclosure 179, one each, above each of the parallel tubing members (pipes) 185 at a distance above each tube which permits focusing of the rays of the sun passing through each lens upon the surface of the tube 185.

Lenses 183 are each cylindrical structures of semicircular cross section having a curved surface facing outwardly toward the sun and a flat surface facing the pipe 185 and extending parallel to the bottom of the rectangular enclosure 179.

A sun dial box 187, FIG. 5, is attached to the outer wall of the rectangular enclosure 179 opposite the wall which is adjacent to the gear 115 and the motor 117. This sun dial box 187 is attached to the rectangular support 179 in such a manner so as to not interfere with the vertical support 171 during a tilt movement of the heat absorbing unit 101 created by a rotation of the shaft 173. Positioned on the inside of two adjacent walls of the sun dial box 187 are a first pair and a second pair of heat sensors, 190, 192, respectively, FIG. 5a, FIG. 5b. The sun dial box 187 has a rectangular configuration approximately 6 inches wide 2 feet long and 1 foot deep and is oriented rectangularly with the side of the rectangular enclosure 179 so that the sides of the sun dial box 187 extend parallel to the sides of the rectangular enclosure 179. Sun dial box 187 has one open side which faces in the same direction as the open side of the rectangular enclosure 179.

The first pair of sun dial heat sensors 190 is positioned on the inside of the first adjacent side 191 of the sun dial box 187. These two first heat sensors 190 are aligned with one another along a line parallel to the edge of the side 191 of the sun dial box 187 which line extends outwardly to the open side of the sun dial box 187. The second pair of sun dial heat sensors 189 are similarly positioned on a side 193 adjacent to the first adjacent side 191 of the sun dial box 187.

Positioned at each end of the cylindrical tubes 185 of the heat absorbing panel 101 is a heat sensitive monitor 194 facing outwardly toward the open side of the rectangular enclosure 179. Each heat monitor 194 is positioned adjacent to the jointure between that tube 185 and the end manifold 187 and 189. The plurality of monitors 194 reside in the plane of the heat absorption component 181 perpendicular to planes of the sensors 190 and 192.

When the gear 109 rotates to align the heat absorbing panel 101 directly with the sun's rays and the gear 115 rotates to tilt the heat absorbing unit directly with the sun's rays, the rays of the sun enter the rectangular enclosure 179 parallel to the first adjacent side wall 191 and the second side wall 193. Similarly, the rays of the sun enter the sun dial box 187 parallel to the side walls thereof and perpendicular to the back walls thereof. Under this condition, each of the sun dial heat sensors 190, 192 positioned on the walls 191, 193 and each of the heat monitors 194 located at each end of the cylindrical tubes 185 of the heat absorption component 181 is in direct sunlight and is heated to output an electrical signal of approximately the same value.

When the rectangular enclosure 179 and the sun dial box 187 are not positioned directly to face the sun, some of the heat monitors 194 are not heated as much as others and unequal signals will be emitted by the various monitors 194.

An electric control for the positioning and operation of the solar heating system may therefore be devised as shown in FIG. 6. The entire electrical control system can be powered from a 110 volt electrical supply 131 to which is connected an electric timer 129. Electric timer 129 enables operation of the platform motor 111 and the tilt motor 115 during an operational heating day. When power is first activated to these motors or when the timer registers the end of an operational heating day, the motors 111, 115 are operated to rotate to their initial start position. This initial start position causes the solar heating unit to return to the easternmost facing position. An operational heating day can be defined to be from 9:00 a.m. to 4:00 p.m. during which time the direct infra-red rays of the sun reaching the earth are at their peak intensity. Timer 127 is connected to regulate the operation of control relays 195. Control relays 195 are also controlled by the operation of storage tank thermocouple 133. When the temperature of the water stored in storage tank 123 reaches its maximum permissible temperature, say, 200° F., storage tank thermocouple 133 will signal relays 195 to turn off the operation of the solar heating system by returning the platform motor and the tilt motor to its start position as well as turning off the pump 125 and will override any other signal from any other component.

Control relays 195 provide activation power to the platform motor 111 and the tilt motor 115 as well as circulator pump 125. During an operational heating day wherein the timer 129 permits activation of the relays 195 and thermocouple 133 does not indicate that the temperature of the water stored in the tank 123 has reached its maximum permissible temperature, the circulating pump 125 will continually operate to circulate water through the solar heat absorbing panel 101.

An absorber heat monitor differential signal circuit 201 is connected to each of the heat sensitive monitors 194. When an uneven signal distribution is received from these monitors 194 which exceeds a certain permissible threshold, an enable signal 203 is sent to a rotate and tilt decoder 205. Rotate and tilt decoder 205 is also connected to the first and second pairs of sun dial heat sensors 190 and 192 and activates the operation of platform motor 111 and/or tilt motor 115 as a function of the signals received from each of the sun dial sensors 190 and 192. Platform motor 111 and tilt motor 115 operate to align the open face of the heat absorber enclosure 179 with the direct rays of the sun, i.e., to have the heat absorbing unit 101 directly facing the sun so that the signals coming from each of the sun dial sensors 190 and 192 is the same. With the sensor pairs 190 and 192 positioned with one sensor behind the other for alignment in a plane parallel to the direct rays of the sun, instead of in a plane perpendicular to the rays of the sun, as with the absorber monitors 194, a more accurate alignment with the sun can be obtained resulting in enhanced heat transfer and greater efficiency for the system.

The control circuit of FIG. 6 will therefore position the heat absorbing panel 101 facing to its most easterly direction at the beginning of the heating day, approximately 9:00 a.m., and will continue to rotate the heat absorbing panel 101 in a clockwise direction from east to south and then to west as the sun travels across the sky. The tilt portion of the control will also direct the tilting of the heat absorbing panel 101 to catch the sun at various heights in the sky throughout the day and throughout the year. While certain error levels are permissible between the signals received from each of the monitors 194 these error levels are not permitted to be so large so as to permit a misalignment of the sun to greatly reduce the heating efficiency of the apparatus. It is expected that a rotation of the heat absorbing unit will occur approximately every 5 minutes throughout the heating day, and would involve approximately 100 individual moves per day.

The embodiment described above has been directed to a preferred design therefor; however, alterations and changes can be made without departing from the scope of the invention. For example, as shown in FIG. 7a, platform motor 111A and tilt motor 115A may be connected directly with the shaft 161 and the shaft 173, respectively. This arrangement would eliminate the need for the gears 109, 115, 163 and 175. The motors 111A and 115A could be controlled for a maximum 360° rotation. Actually, the platform motor 111A would have limits set for a 270° rotation between east and west and would be directed to follow the sun's path throughout the daylight hours. The tilt motor 115 would have limit stops established for 90° rotation between vertical and horizontal. The motors 111A and 115A with this arrangement would therefore be operated as servomotors. A more sophisticated electrical control system may be implemented when the motors 111A and 115A are so operated.

Whether a servomotor operation is implemented or not, an enhanced control system could be implemented wherein each of the signals from the monitors 194 and the sun dial box sensors 190 and 192 are isolated to provide an individual output voltage as a function of the temperature of the individual sensor or monitor and therefore as a function of the amount of sunlight falling on it. Each voltage could be entered into a logical decoder which could precisely decode the angle at which the heat absorbing panel 101 is facing the sun and determine what degree of rotation it must move to be orthogonally aligned with the sun's direct rays. The motors 111 and 115 or 111A and 115A could be rotated clockwise or counter-clockwise, as the need may be, to correctly align the solar heating panel 101 with the sun. A more sophisticated timer 129 could be included which would permit a resetting of the orientation of the heat absorbing panel 101 at the beginning of the day and whenever the thermocouple 133 located within the storage tank 123 indicates that the temperature of the water within the storage tank 123 has dropped below the maximum permissible temperature as long as timer 129 indicates that an operational heating day is in progress. Heat sensor control 197 could direct platform and tilt motors into a "search mode" which would cause the heat absorbing panel 101 to be rotated from east to west and from vertical to horizontal to locate the sun. The movement of the heat absorbing panel 101 would be controlled in each direction as a function of the signals from the monitors 194 and the sensors 190 and 192.

Additional changes can be made in the embodiments presented above as well as certain alternatives incorporated thereto without departing from the intent and scope of the invention. It is intended, therefore, that this disclosure be considered in the illustrative sense and not be taken in the limiting sense.

What is claimed is:

1. In a solar heating system having a fluid conducting heat absorbing panel extending in a plane and mounted on a support for rotation in two directions, a lens system mounted in front of said panel for concentrating solar rays thereupon, and a storage tank for holding heated fluid, said tank being connected to said absorbing panel, the improvement comprising:

first means for rotating said absorbing panel in a first said direction, said first rotating means being attached to said support;

second means for rotating said absorbing panel in a second said direction, said second rotating means being attached to said support; and means for controlling the operation of said first and second rotating means including a plurality of electrical heat sensitive monitors located upon said heat absorbing panel in the plane of said panel and a plurality of electrical heat sensors located apart from said heat absorbing panel in a plane perpendicular to the plane of said heat absorbing panel.

2. The improved system of claim 1 wherein said control means also includes:

means for monitoring the output of said plurality of heat sensitive monitors for outputing an enable signal when the output from said plurality of heat sensitive monitors is unequal; and means for decoding the output signals from said plurality of sensors in the presence of said first circuit means output enable for directing the operation of said first and second rotating means.

3. The improved system of claim 2 wherein said control means also includes an electric clock timer providing electric power to enable and disable operation of said first and second rotating means for enabling said first and second rotating means only during the day, irrespective of direction from said decoding means.

4. The improved system of claim 3 wherein said control means also includes an electric heat thermocouple located within said storage tank and connected to provide an electric signal when the temperature inside said storage tank is below a threshold temperature, said thermocouple signal being connected to enable operation of said first and second rotating means when said storage tank temperature is below threshold, irrespective of said clock timer and said decoding means operation.

5. The improved system of claim 4 wherein said control means includes control relays, said control relays providing an electrical connection between said clock timer and said first and second rotating means, said control relays providing a reset of said first and second rotating means to an initial beginning of the day easterly orientation upon an end of day disable from said clock timer.

6. The improved system of claim 5 wherein said control relays also provide a reset of said first and second rotating means to an initial beginning of day easterly orientation upon extinguishment of said storage tank thermocouple signal.

7. The improved system of claim 6 including means for circulating said fluid between said storage tank and said absorbing panel, said circulating means being connected therebetween and being enabled for operation by said control relays in the presence of said clock timer enable and said storage tank thermocouple signal.

8. The improved system of claim 7 wherein said decoding means is connected to dictate the operation of said first and second rotating means to rotate absorbing panel when the output signal from said plurality of heat sensors is unequal.

9. The improved system of claim 8 said plurality of heat sensors includes a first pair of heat sensors located in a first said perpendicular plane to the plane of said heat absorbing panel and a second pair or heat sensors located in a second said perpendicular plane to the plane of said heat absorbing panel.

10. The improved system of claim 9 wherein said decoding means dictates operation of said first rotating means in response to unequal signals from said first pair of heat sensors and dictates operation of said second rotating means in response to unequal signals from said second pair of heat sensors.

11. The improved system of claim 1 wherein said lens system comprises a plurality of individual lenses spaced apart from one another and positioned in a fixed positional relationship to said absorbing panel, each lens being cylindrically shaped having a half-circular cross-section with the flat side facing said absorbing panel.

12. The improved system of claim 2 wherein each said lens flat side is parallel to the plane of said absorbing panel.

13. The improved system of claim 12 also including means for circulating fluid between said heat absorbing panel and said storage tank and means for inactivating said circulating means and for dictating the operation of said first and second rotating means for moving said heat absorbing panel out of the rays of the sun when the temperature of the fluid within said storage tank attains a desired temperature, said circulating means being connected to said heat absorbing panel and said storage tank, said inactivating and dictating means being connected to said circulating means, said storage tank and said first and second rotating means.

14. The improved system of claim 13 wherein said first rotating means includes a first gear system connected to said heat absorbing panel to rotate said panel between an easterly and a westerly direction; and a first electric motor positioned to operate said first gear system; said first electric motor being connected to said control means; and wherein said second rotating means includes a second gear system connected to said first gear system and to said heat absorbing panel to tilt said panel between vertical and horizontal; and a second electrical motor positioned to operate said second gear system.

* * * * *